United States Patent [19]

Fukunaga et al.

[11] Patent Number: 4,580,891

[45] Date of Patent: Apr. 8, 1986

[54] OPTICAL POSITIONING APPARATUS FOR ELECTROPHOTOGRAPHIC COPYING MACHINE

[75] Inventors: Takahiro Fukunaga; Kenichi Iwamoto, both of Nara, Japan

[73] Assignee: Sharp Kabushiki Kaisha, Osaka, Japan

[21] Appl. No.: 634,423

[22] Filed: Jul. 26, 1984

[30] Foreign Application Priority Data

Aug. 25, 1983 [JP] Japan ............................... 58-156728

[51] Int. Cl.⁴ ............................................. G03B 27/34

[52] U.S. Cl. ........................................ 355/57; 355/60; 355/66

[58] Field of Search ........................ 355/51, 55, 56, 57, 355/58, 60, 66

[56] References Cited

U.S. PATENT DOCUMENTS 3,709,603 1/1973 Furuichi ................................ 355/60

4,007,986 2/1977 Komori et al. ........................ 355/57

*Primary Examiner*—L. T. Hix

*Assistant Examiner*—Brian W. Brown

*Attorney, Agent, or Firm*—Birch, Stewart, Kolasch & Birch

[57] ABSTRACT

An optical apparatus for an electrophotographic copying machine comprises a lens base unit, a mirror base unit, and a driving unit. The lens base unit and the mirror base unit are independently moved by driving a single shaft.

3 Claims, 4 Drawing Figures

OPTICAL POSITIONING APPARATUS FOR ELECTROPHOTOGRAPHIC COPYING MACHINE

BACKGROUND OF THE INVENTION

The present invention relates to an electrophotographic copying machine and, more particularly, to an optical apparatus for an electrophotographic copying machine of the type able to make copies at different magnification.

An electrophotographic copying machine produces an electrostatic latent image on a photoreceptor corresponding to a pattern image on a document such as a manuscript or book to be copied. Toner particles are electrostatically adhered to the latend image, so that the latent image becomes visible as a toner image. The toner image on the photoreceptor is transferred onto a copy paper via a transference charger.

In some types of electrophotographic copying machines, there is employed an optical apparatus comprising a plurality of mirrors and an objective lens assembly for forming an image of an original to be copied on the photoreceptor. The plurality of mirrors and the objective lens assembly are moved to change magnification of the original image.

Conventionally, a lens and mirrors must be moved independently so that the optical apparatus becomes complex. Therefore, it is desired to provide an improved simplified optical apparatus.

SUMMARY OF THE INVENTION

Accordingly, it is an object for the present invention to provide an improved optical apparatus of an electrophotographic copying machine for changing original magnification.

It is another object of the present invention to provide an improved optical apparatus for an electrophotographic copying machine for moving a lens and a mirror by driving a single shaft means.

It is a further object of the present invention to provide an improved optical apparatus for an electrophotograhic copying machine, the optical apparatus comprising a lens base unit, a mirror base unit, and a driving unit, in which the lens base unit and the mirror base unit are moved by driving a single shaft means.

Briefly described, in accordance with the present invention, an optical apparatus for an electrophotographic copying machine comprises a lens base unit, a mirror base unit, and a driving unit. The lens base unit and the mirror base unit are independently moved by driving a single shaft means.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
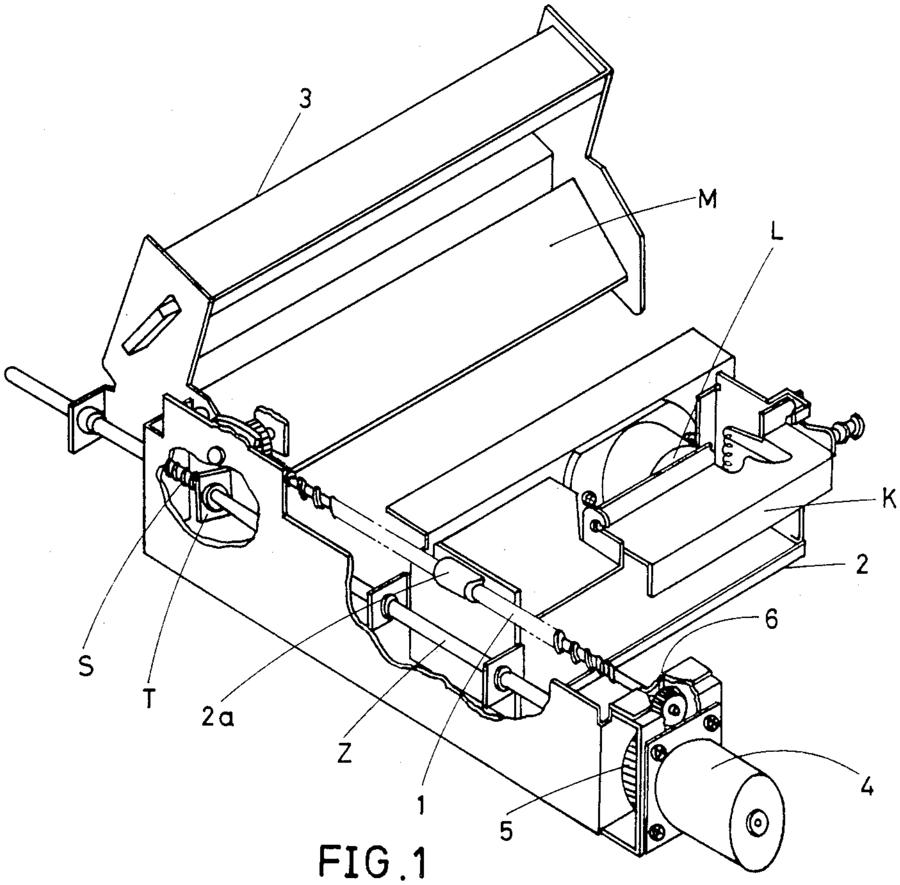
FIG. 1 is a perspective view of an optical apparatus for an electrophotographic copying machine according to the present invention.

FIG. 1 is a perspective view of an optical apparatus for an electrophotographic copying machine according to the present invention.

The optical apparatus comprises a lens base unit, a mirror base unit, and a driving unit. The lens base unit includes a lens and a lens supporter engaged with a shaft means, so that the lens base unit is moved aong the longitudinal direction of the shaft means. The mirror base unit includes a morror and a mirror supporter engaged with the shaft means, so that the mirror base unit is also moved aong the longitudinal direction of the shaft means. The driving unit is provided for moving the lens base unit and the mirror base unit by driving the shaft means.

Referring now to FIG. 1, the optical apparatus comprises a threaded shaft 1, a lens base unit 2, a mirror base unit 3.

The lens base unit 2 and the mirror base unit 3 are moved by driving the shaft 1 while these base units 2 and 3 are engaged with a slide shaft Z positioned in parallel with the shaft 1, for safe movement.

A spring S is positioned at an end of the slide shaft Z adjacent the miror base unit 3. The spring S is provided for biasing a part T connected to the mirror base unit 3.

The lens base unit 2 includes a lens (not shown), a lens supporter L for supporting the lens, and a shutter K for adjusting the amount of light to be incident upon the lens. The shutter K is switched open and closes to limit the light to the lens.

The mirror base unit 3 includes a mirror M and additional mirrors (not shown).

A motor 4 is provided for rotating the shaft 1 by the rotation of a first gear 5 and a second gear 6. These form the driving unit.

The shaft 1 is threadedly engaged with the lens base unit 2 and the mirror base unit 3. A threaded connection **2*a* between the shaft 1 and the lens base unit 2 is provided for directly converting the rotation of shaft 1 into linear motion of the body of the lens base unit 2 for a given shift distance. The threaded connection between the shaft 1 and the mirror base unit 3 is not visible in FIG. 1. The latter threaded connection is provided for indirectly converting the rotation of the shaft 1 into linear motion of the body of the mirror base unit 3, reducing the relative shift distance. Thus, for each rotation of the shaft 1, the lens base unit 2 is moved a distance different from that of the mirror base unit 3**, which will be described in more detail below.

Figure 2:
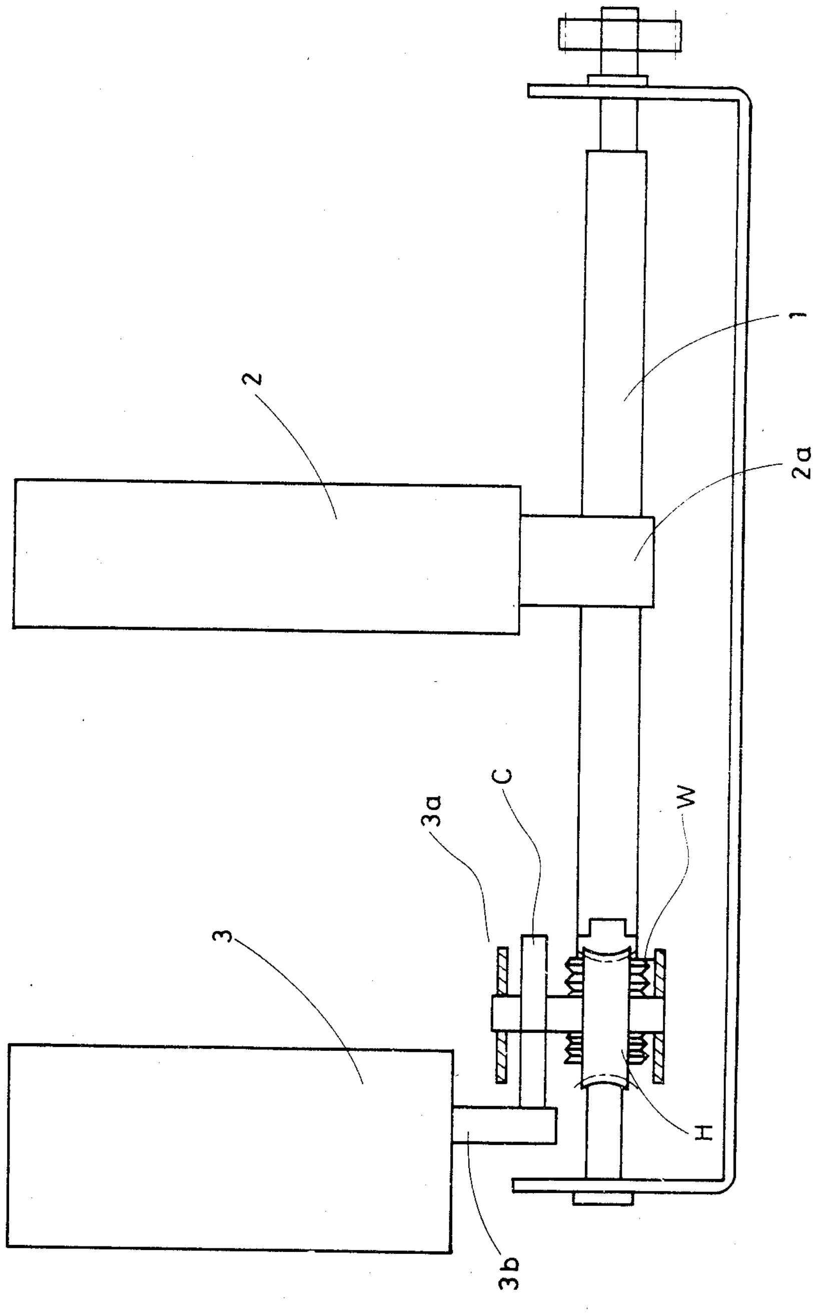
FIG. 2 is a side view of the optical apparatus, showing a shaft means and its associated elements in the apparatus.
Figure 3:
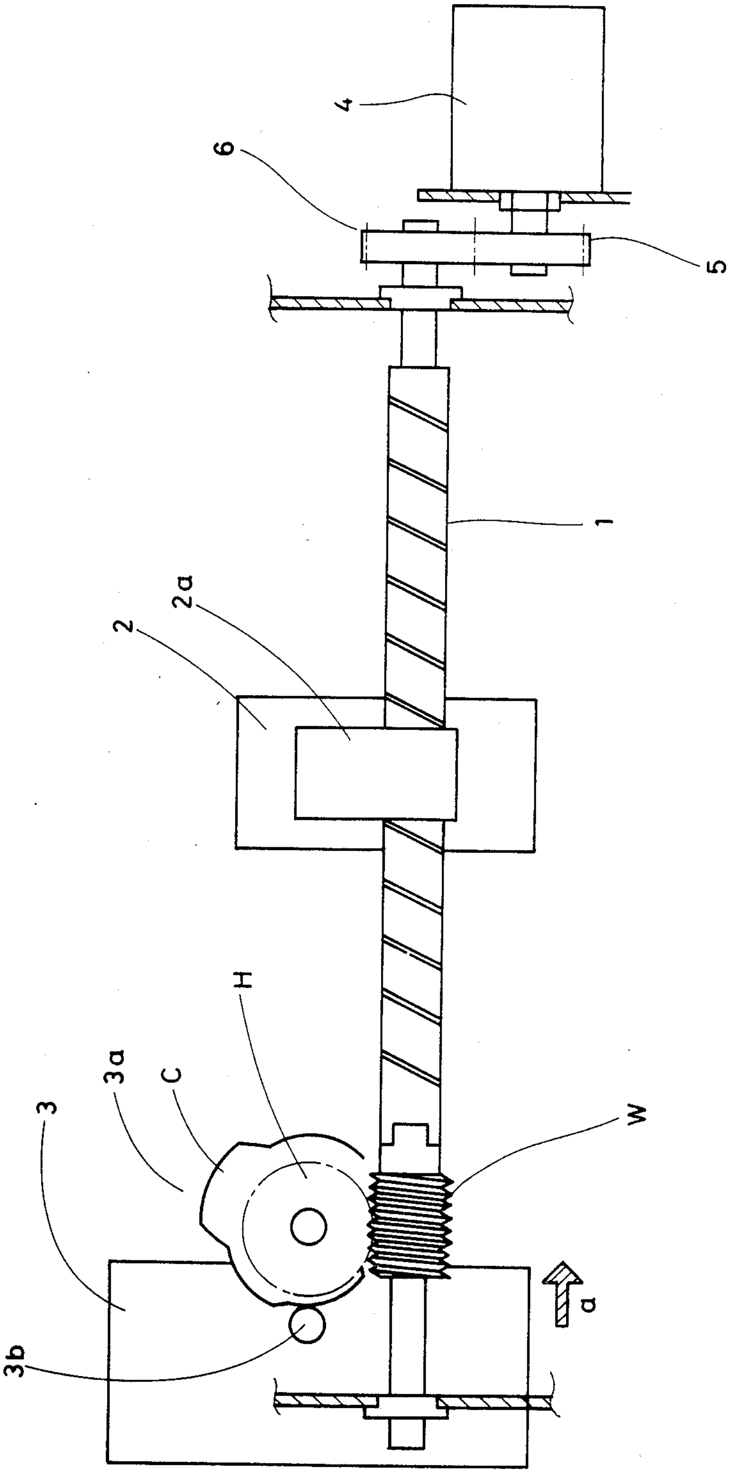
FIG. 3 is a plan view of the shaft means and its associated elements in the optical apparatus.

FIGS. 2 and 3 are a side view and a plan view, respectively, of the shaft 1 and neighboring elements in the optical apparatus. Like elements corresponding to those of FIG. 1 are indicated by like numerals.

A screw joint **3*a* between the shaft 1 and the mirror base unit 3 is provided with a worm W surrounding the shaft 1, a worm wheel H engaged with the worm W, and a cam C on the same shaft as the worm wheel H. The cam C is continuously in contact with a rod-like boss 3*b* protruding in an axis direction from the mirror base unit 3. This is because the mirror base unit 3 is continuously forced in the direction of arrow a in FIG. 3** by the spring S.

The cam C is rotated with driving force transmitted from the worm W to the worm wheel H in response to the rotation of the shaft 1. Since the radius differs around the periphery of the cam C, the rotaion of the cam C permits the boss 3*b* of the mirror base unit 3 to be moved by distances corresponding to the different relative radii. Hence, the mirror base unit 3 is moved and positioned at a position corresponding to selected magnification. The changing steps of the periphery of the cam C is more than the number of magnifications. Of course, it may be possible that the radius of the periphery of the cam C is made as a continuous curve so as to continuously change the position of unit 3 along a continuum of desired magnification.

Thus, according to the present invention, the lens base unit 2 and the mirror base unit 3 are independently moved with the following advantages:

(1) at the position of the screw joint 2*a*

With the help of the lead screw of the shaft 1, forward pitch can be freely adjusted by varying the number of rotations of the motor 4, thereby improving design flexibility.

(2) at the position of the screw joint 3*a*

With the help of the worm gear, the reduction ratio may be made large. In addition, accurate control of movement is possible.

In a preferred embodiment of the present invention, the lens base unit 2 is moved about 120 mm while the mirror base unit 3 is moved about 16 mm. Movement distances can be varied by modification of the pitch of the worm wheel H.

Figure 4:
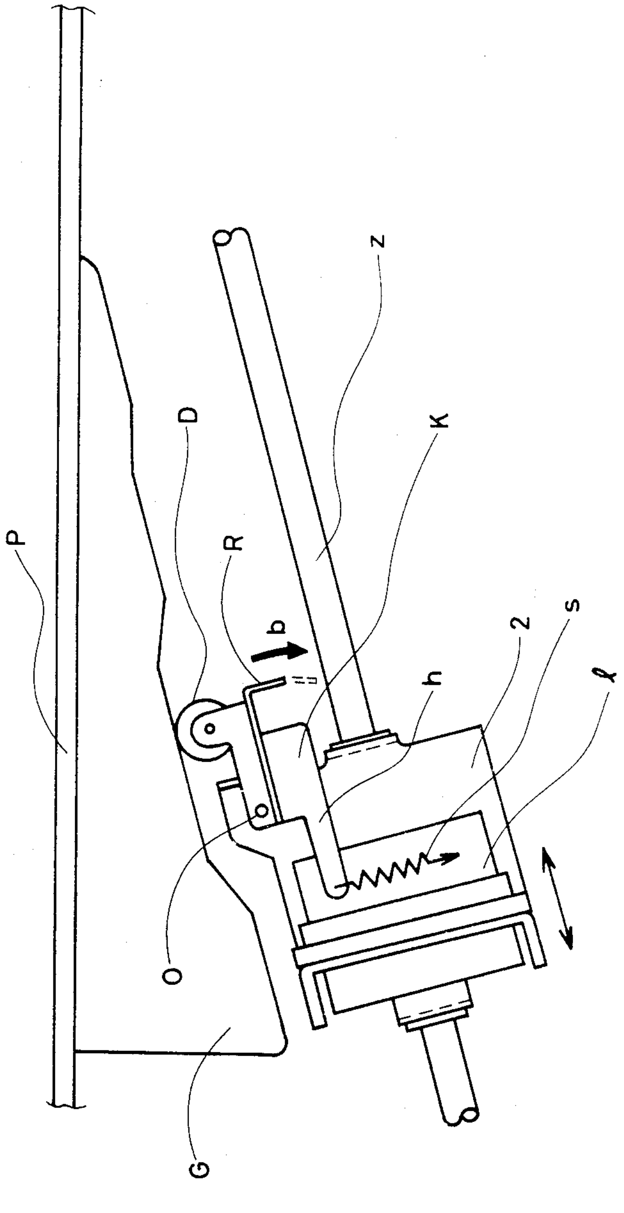
FIG. 4 is a side view of a shutter assembly in the optical apparatus of FIG. 1.

FIG. 4 shows a shutter assembly in the optical apparatus. The shutter K is automatically switched open and closed to adjust the light amount while the lens base unit 2 is moved along the shaft 1 and the slide shaft Z by rotation of the shaft 1.

In FIG. 4, the lens base unit 2 contains a lens 1 at the inner portion. The shutter K is driven to limit the width of the light path to the lens 1 toward a side of the lens 1 (the right side of the same in FIG. 4). The shutter K comprises a roller D, a rotation supporter h, a shield plate R, and a tension spring s. The rotation supporter h is rotated by the roller D and the spring s around a pivotal axis O. The shield plate R rotates with supporter h around the pivotal axis O of the rotation supporter h, so as to shade a light path on one side of the lens 1. The movement of the shield plate R is illustrated with an arrow b.

The roller D is positioned opposed to the extending tension spring s with respect to the pivotal axis O. The extending spring s is provided for pulling an end of the rotation supporter h to rotate it counterclockwise around the pivotal axis O. The roller D serves to limit the counterclockwise force of the extending spring s at a predetermined position.

The roller D is moved on a guide G, defining a travel pathway, fixed on a fram P of the body of the copying machine. The roller D is not statically positioned with respect to the guide G since the guide G is flat at some predetermined portions and inclined at some transit portions between the flat portions. Although the flat portions of the guide G are in parallel with the slide shaft Z, the relative distances between the slide shaft Z and the respective flat portions are different from each other. While the lens base unit 2 is moved along the slide shaft Z, the roller D enables the shield plate R to be moved to cover the lens 1 according to the shape change of the guide G, depending on magnification.

As stated above, in accordance with the present invention, the optical apparatus for the copying machine for moving the lens and the mirror comprises the lens base unit, the mirror base unit, and the driving unit, in which the lens base unit and the mirror base unit are moved by driving the single shaft means. Therefore, it affords flexibility to design the optical apparatus with low cost and light weight. According to the present invention, it is unnecessary to provide a standard plate for the optical apparatus.

While only certain embodiments of the present invention have been described, it will be apparent to those skilled in the art that various changes and modifications may be made therein without departing from the spirit and scope of the present invention as claimed.

What is claimed is:

1. An optical apparatus for an electrophotographic copying machine consisting essentially of:

mirror means including a mirror and mirror support means;

lens means including a lens and lens support means;

said mirror means and said lens means being movable with respect to each other to vary magnification by said copying machine; and driving means for moving said mirror means and said lens means selected distances for varying magnification by said copying machine;

said driving means comprising a sole threaded shaft and motor means for rotating said threaded shaft;

threaded engaging means associated with said lens support means and threadedly engaged with said threaded shaft for converting rotation of said threaded shaft into linear movement of said lens means;

a worm gear associated with said threaded shaft and rotatably driven thereby about a first axis colinear with the axis of said threaded shaft, a second gear driven by said worm gear rotatably about a second axis substantially perpendicular to said first axis, and a cam means jointly driven with said second gear rotatably about said second axis;

said mirror support means comprising a boss engaged with said cam means for converting rotation of said cam means into linear movement of said mirror means.

2. An optical apparatus as in claim 1, wherein each rotation of said sole threaded shaft results in a first amount of linear movement of said lens means and a different second amount of linear movement of said mirror means.

3. An optical apparatus as in claim 2, wherein said first amount of linear movement is greater than said second amount.

* * * * *